United States Patent
Bruno et al.

(10) Patent No.: US 11,254,435 B2
(45) Date of Patent: Feb. 22, 2022

(54) SUPPLEMENTAL PACK DRIVEN BY BLEED AIR AND CABIN AIR

(71) Applicant: Hamilton Sundstrand Corporation, Charlotte, NC (US)

(72) Inventors: Louis J. Bruno, Ellington, CT (US); Christina W. Millot, Wilbraham, MA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 252 days.

(21) Appl. No.: 15/783,816

(22) Filed: Oct. 13, 2017

(65) Prior Publication Data
US 2019/0112052 A1    Apr. 18, 2019

(51) Int. Cl.
*B64D 13/06*    (2006.01)
*F04D 25/02*    (2006.01)
*F01D 15/08*    (2006.01)

(52) U.S. Cl.
CPC ............. *B64D 13/06* (2013.01); *F01D 15/08* (2013.01); *F04D 25/024* (2013.01); *B64D 2013/0603* (2013.01); *B64D 2013/064* (2013.01); *B64D 2013/0618* (2013.01); *B64D 2013/0648* (2013.01)

(58) Field of Classification Search
CPC ... B64D 13/06; B64D 2013/064; F01D 15/08; F04D 25/04; F04D 1/06; F04D 17/12; F04D 25/024; F24F 5/0085
See application file for complete search history.

(56) References Cited

U.S. PATENT DOCUMENTS

| | | | |
|---|---|---|---|
| 3,014,639 A * | 12/1961 | Boli | F04D 29/5826 417/243 |
| 4,419,926 A | 12/1983 | Cronin et al. | |
| 5,461,882 A | 10/1995 | Zywiak et al. | |
| 9,254,920 B2 | 2/2016 | Zhou et al. | |
| 9,669,936 B1 * | 6/2017 | Fiterman | B64D 13/06 |
| 2015/0307196 A1 * | 10/2015 | Bruno | F02C 6/08 62/61 |
| 2016/0083100 A1 * | 3/2016 | Bammann | B64D 13/06 62/89 |
| 2016/0347456 A1 | 12/2016 | Bruno et al. | |

OTHER PUBLICATIONS

European Application No. 18199437.7 filed Oct. 9, 2018; European Search Report dated Feb. 21, 2019; 9 pages.

* cited by examiner

*Primary Examiner* — Philip E Stimpert
(74) *Attorney, Agent, or Firm* — Cantor Colburn LLP (57) ABSTRACT

An airplane is provided. The airplane includes a pack. The pack includes a shaft, a compressor, and a turbine coupled to the compressor via the shaft. The turbine receives and expands a first medium to provide power to the compressor via the shaft. The compressor receives and compresses a second medium in accordance with the power provided by the turbine via the shaft. The turbine is fluidly coupled to a heat exchanger of an air conditioning system.

15 Claims, 5 Drawing Sheets

SUPPLEMENTAL PACK DRIVEN BY BLEED AIR AND CABIN AIR

BACKGROUND

In general, conventional aircraft air condition systems are supplied bleed air at a pressure of approximately 30 pounds per square inch (psig) to 35 psig at cruise. Every pound per minute of bleed air used to ventilate an aircraft is a penalty to an aircraft performance throughout an operating envelope of the aircraft.

BRIEF DESCRIPTION

According to one or more embodiments, a pack is provided. The pack includes a shaft, a compressor, and a turbine coupled to the compressor via the shaft. The turbine receives and expands a first medium to provide power to the compressor via the shaft. The compressor receives and compresses a second medium in accordance with the power provided by the turbine via the shaft. The turbine is fluidly coupled to a heat exchanger of an air conditioning system.

In accordance with one or more embodiments or the pack embodiment above, the pack can comprise a second turbine coupled to the compressor via the shaft.

In accordance with one or more embodiments or any of the pack embodiments above, the second turbine can receive and expand a third medium to provide power to the compressor via the shaft.

In accordance with one or more embodiments or any of the pack embodiments above, the pack can comprise a second compressor coupled to the shaft.

In accordance with one or more embodiments or any of the pack embodiments above, the second compressor can provide a second stage of compression of the second medium.

In accordance with one or more embodiments or any of the pack embodiments above, the first medium can be bleed air, and the second medium can be fresh air.

In accordance with one or more embodiments or any of the pack embodiments above, the pack can be configured to operate in a first or second mode.

In accordance with one or more embodiments or any of the pack embodiments above, the first mode can be utilized for low altitude or ground operations.

In accordance with one or more embodiments or any of the pack embodiments above, the second mode can be utilized for high altitude operations.

According to one or more embodiments, a system is provided. The system comprises an air conditioning pack comprising a heat exchanger. The system comprises a supplemental pack comprising a shaft, a compressor, and a turbine coupled to the compressor via the shaft, and at least one heat exchanger. The turbine is fluidly coupled to the heat exchanger. The turbine receives and expands a first medium from the heat exchanger. The turbine provides power to the compressor via the shaft based on the expansion of the first medium. The compressor receives and compresses a second medium in accordance with the power provided by the turbine via the shaft.

In accordance with one or more embodiments or the system embodiment above, the pack can comprise a second turbine coupled to the compressor via the shaft, and the second turbine can receive and expand a third medium to provide power to the compressor via the shaft.

In accordance with one or more embodiments or any of the system embodiments above, the pack can comprise a second compressor coupled to the shaft, and the second compressor can provide a second stage of compression of the second medium.

In accordance with one or more embodiments or any of the system embodiments above, the first medium can be bleed air, and the second medium can be fresh air.

In accordance with one or more embodiments or any of the system embodiments above, the pack can be configured to operate in a first or second mode.

In accordance with one or more embodiments or any of the system embodiments above, the first mode can be utilized for low altitude or ground operations, and the second mode can be utilize for high altitude operations.

BRIEF DESCRIPTION OF THE DRAWINGS

The subject matter is particularly pointed out and distinctly claimed in the claims at the conclusion of the specification. The forgoing and other features, and advantages thereof are apparent from the following detailed description taken in conjunction with the accompanying drawings in which:

DETAILED DESCRIPTION

A detailed description of one or more embodiments of the disclosed apparatus and method are presented herein by way of exemplification and not limitation with reference to the FIGS.

Embodiments herein provide a combined pack architecture that has one or more air conditioning packs and one or more supplemental packs. The one or more supplemental packs can provide a significant bleed air flow reduction by utilizing cabin discharge air expanded though a turbine to power a fresh ram air compressor and/or utilize bleed air though a turbine to power the fresh ram air compressor. The technical effects and benefits of the above the supplemental pack include reduction of bleed air from the engines and/or a reduction in ram air used by the air conditioning packs (e.g., providing a further reduction in the aircraft fuel burn by reducing the drag penalty associated with the ram air flow reduction due to the supply of the exhaust air to the ram circuit).

Figure 1:
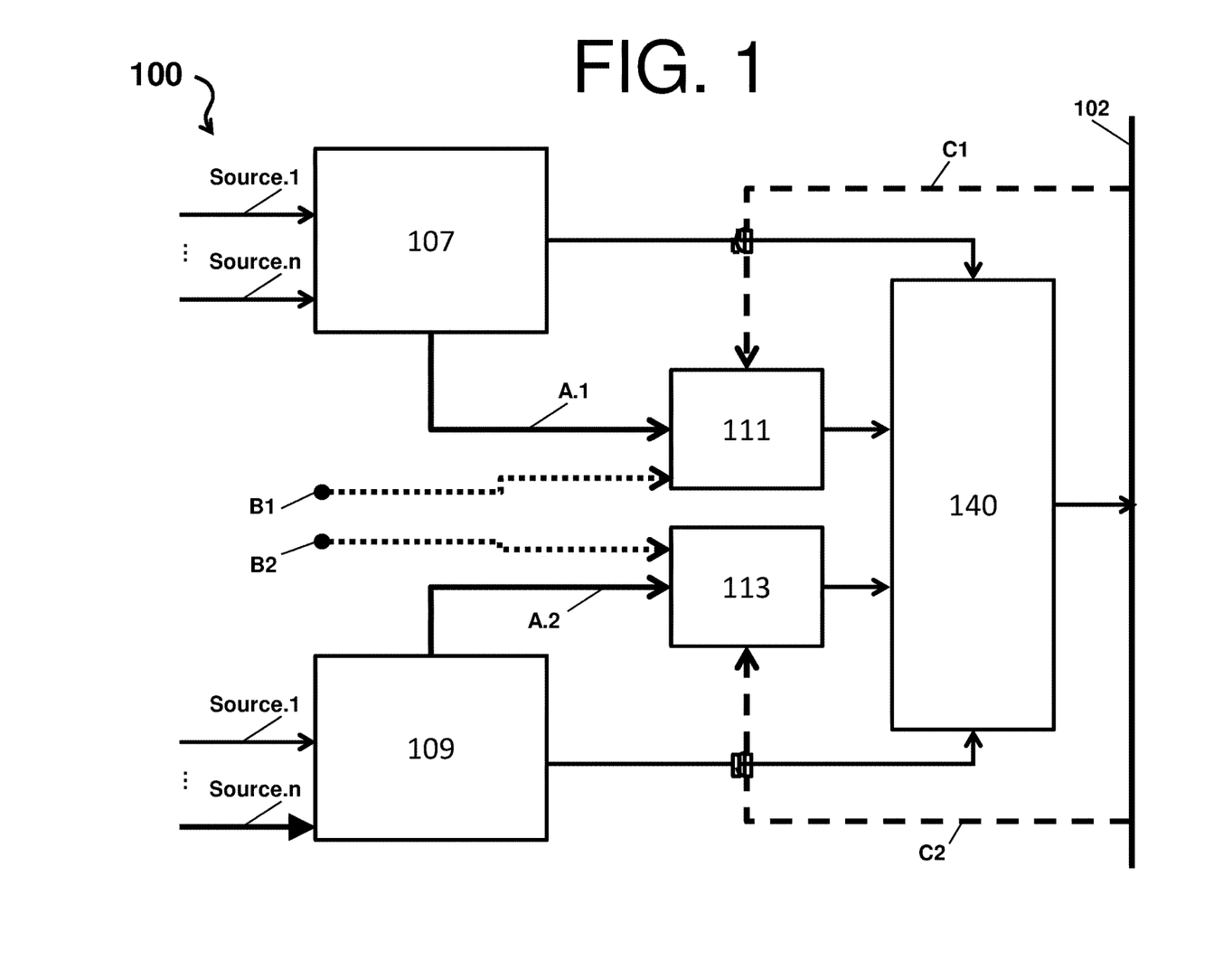
FIG. 1 is a diagram of a schematic of a combined pack architecture according to one or more embodiments.

Turning now to FIG. 1, a diagram of a schematic of a combined pack architecture 100 is depicted according to one or more embodiments. The combined pack architecture 100 comprises a volume 102, a first air conditioning pack 107, a second air conditioning pack 109, at least one supplemental pack (represented by first and second supplemental packs 111 and 113), and a mixing circuit 140.

The combined pack architecture 100 is an example of an environmental control system of an aircraft that conditions and mixes mediums from different sources (e.g., arrows Source.1 and Source.n, where 'n' is an integer greater than 1) and uses the different energy sources to power the environmental control system and to provide cabin pressurization and cooling at high fuel burn efficiency (e.g., provide a mixed medium to a volume 102). The medium can generally be air, while other examples include gases and liquids.

The elements of the combined pack architecture 100 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the combined pack architecture 100. Valves can be operated by actuators, such that flow rates of the medium in any portion of the combined pack architecture 100 can be regulated to a desired value.

The schematic of the combined pack architecture 100 is depicted according to a non-limiting embodiment, as it could be installed on an aircraft. The aircraft example is not intended to be limiting, as alternative embodiments are contemplated In view of the above aircraft embodiment, a first medium can be bleed air, which is pressurized air supplied to or originating from (being "bled' from) an engine or auxiliary power unit of the aircraft. Note that temperature, humidity, and pressure of the bleed air can vary widely depending upon a compressor stage and revolutions per minute of the engine. Generally, the bleed air described herein is low-pressure air. The volume 102 can be pressurized air within an aircraft cabin or a combined flight deck and aircraft cabin. Generally, the pressurized air described herein is at a pressure that creates a safe and comfortable environment for humans on the aircraft. As shown in FIG. 1, the first air conditioning pack 107 can be fluidly connected to the first supplemental pack 111. In this regard, bleed air received from one or more sources by the first air conditioning pack 107 can be supplied to the first supplemental pack 111 (e.g., see arrow A.1). Further, the second air conditioning pack 109 can be fluidly connected to the second supplemental pack 113. In this regard, bleed air received from one or more sources by the second air conditioning pack 109 can be supplied to the second supplemental pack 113 (e.g., see arrow A.2).

A second medium can be fresh air, which can be outside air destined to enter the volume 102. The fresh air can be procured by one or more scooping mechanisms, such as an impact scoop or a flush scoop. These scooping mechanisms can be considered fresh air or outside air inlets. Generally, the fresh air described herein is at an ambient pressure outside of the aircraft with respect to altitude. As shown in FIG. 1, the first and second supplemental packs 111 and 113 can be fluidly connected to the one or more scooping mechanisms (e.g., see circles B1 and B2) to receive fresh air.

A third medium can be procured from the volume 102. That is, the third medium can be cabin discharge air, which can be air leaving the volume 102 and dumped/discharged overboard. For example, the cabin discharge air can be supplied to a destination, such as an outlet. Examples of the outlet can include, but are not limited to, overboard after exiting the pack and/or a ram circuit (which is provided overboard). As shown in FIG. 1, the first and second supplemental packs 111 and 113 can be fluidly connected to the volume 102 (e.g., see circles C1 and C2) to receive cabin discharge air.

The mixing circuit 140 is a mechanical configuration that combines the conditioned medium flowing from the first and second air conditioning packs 107 and 109 and from the supplemental packs 111 and 1113 to provide a resulting combined conditioned medium to the volume 102.

The first air conditioning pack 107 and the second air conditioning pack 109 can individually perform or extract work from the above mediums to achieve certain operations required at different altitudes. The first and second air conditioning packs 107 and 109 can comprise a ram circuit including a shell encasing one or more heat exchangers. The shell can receive and direct a medium (such as ram air described herein) through its corresponding pack. The one or more heat exchangers are devices built for efficient heat transfer from one medium to another. Examples of heat exchangers include double pipe, shell and tube, plate, plate and shell, adiabatic wheel, plate fin, pillow plate, and fluid heat exchangers. The one or more heat exchangers encased by the shell can be referred to as ram heat exchangers.

The first and second air conditioning packs 107 and 109 can comprise a compressing device including various combinations of compressors, turbines, fans, and shafts. The compressing device is a mechanical device that includes components for performing thermodynamic work on the mediums. Examples of the compressing device include an air cycle machine, a three-wheel air cycle machine, a four-wheel air cycle machine, etc. The first and second air conditioning packs 107 and 109 can also comprise water extractors, a condensers, etc.

The first and second supplemental packs 111 and 113 can comprise different arrangements of compressors, turbines, and heat exchangers, which can be used to reduce an overall bleed air penalty of the first and second air conditioning packs 107 and 109 while meeting cabin inflow requirements of the aircraft. Example arrangements will now be described with respect to FIGS. 2-5.

Figure 2:
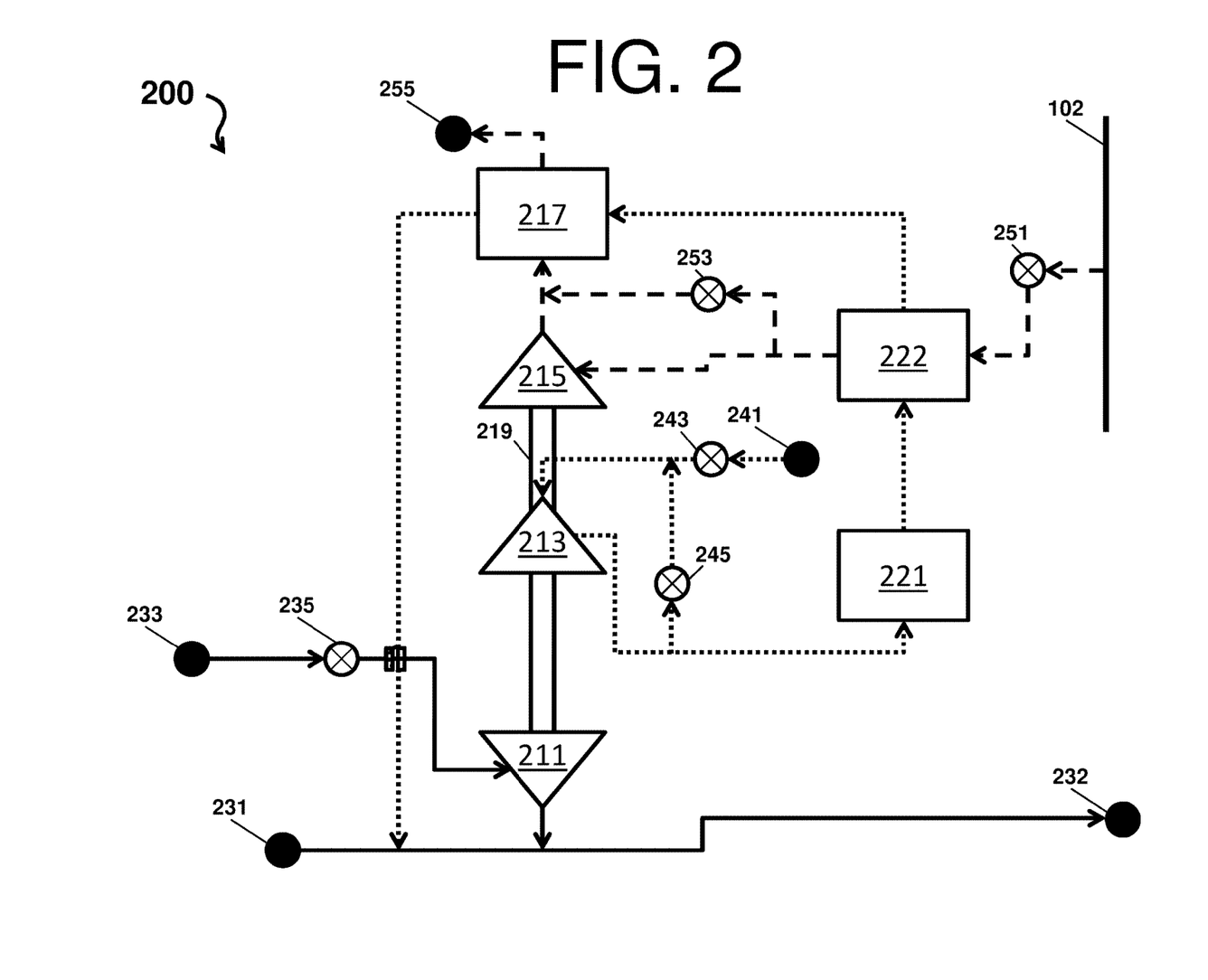
FIG. 2 is a diagram of a schematic of a supplemental pack according to one or more embodiments.

FIG. 2 is a diagram of a schematic of a supplemental pack 200 (e.g., one of the first and second supplemental packs 111 and 113 of FIG. 1) according to one or more embodiments. Components of the pack 200 that are similar to the combined pack architecture 100 of FIG. 1 have been reused for ease of explanation, by using the same identifiers, and are not re-introduced. The supplemental pack 200 comprises a turbine 211, a compressor 213 (e.g., a fresh ram air compressor), and a turbine 215, each of which is connected by a shaft 219. The supplemental pack 200 comprises a heat exchanger 217, an ozone converter 221, and a heat exchanger 222 (e.g., an outflow heat exchanger).

The supplemental pack 200 can comprise a first medium flow path designated by the solid-lined arrows. The first medium flow path can be considered a bleed air flow path. In accordance with one or more embodiments, the bleed air can flow from an air conditioning pack outlet 231 (e.g., from a turbine of one of the first and second air conditioning packs 107 and 109 of FIG. 1) to a supplemental pack outlet 232 (e.g., to the volume 102 of the combined pack architecture 100 of FIG. 1). Further, the bleed air can also be supplied from an air conditioning pack outlet 233 (e.g., from a primary heat exchanger of one of the first and second air conditioning packs 107 and 109 of FIG. 1) through a valve 235 to the turbine 211, which provides the bleed air to the supplemental pack outlet 232. In this regard, for example, the turbine 211 is fluidly coupled to the primary heat exchanger of one of the first and second air conditioning packs 107 and 109 of FIG. 1.

The supplemental pack 200 can comprise a second medium flow path designated by the dotted-lined arrows. The second medium flow path can be considered a fresh air flow path. In accordance with one or more embodiments, the fresh air can flow from an outside air inlet 241 (e.g., from one or more scooping mechanisms) through a valve 243 to the compressor 213. The fresh air can further flow from the compressor 213 through the ozone converter 221 and the heat exchangers 222 and 217 to the supplemental pack outlet 232 (via the bleed air flow path as shown). Also, the fresh air can further flow from the compressor 213 through a valve 245 and back to the compressor 213.

The supplemental pack 200 can comprise a third medium flow path designated by the dashed-lined arrows. The third medium flow path can be considered a cabin discharge air flow path. In accordance with one or more embodiments, the cabin discharge air flow from the volume 102 through a valve 251 to the heat exchanger 222. The cabin discharge air can further flow from the heat exchanger 222 to the turbine 215, which provides the cabin discharge air to the heat exchanger 217. Also, the cabin discharge air can further flow from the heat exchanger 222 through a valve 253 directly to the heat exchanger 217. Note that the cabin discharge air exits from the heat exchanger 217 to a supplemental pack outlet 255, which can be fluidly coupled to a ram circuit that exhausts overboard.

Example operations of the combined pack architecture 100 of FIG. 1 and the supplemental pack 200 of FIG. 2 will now be described with respect to modes. For instance, the combined pack architecture 100 of FIG. 1 and the supplemental pack 200 of FIG. 2 can operate is a first or second mode. The first mode can be utilized for low altitude and/or ground operations. Other example of conditions when the first mode would be utilized include conditions such as ground idle, taxi, take-off, and hold conditions. The second mode can be utilized for high altitude operations. Other example of conditions when the second mode of operation would be utilized include conditions such as high altitude cruise, climb, and descent flight conditions.

In a low altitude operation and/or a ground operation of the supplemental pack 200 (e.g., the first mode), high-pressure high-temperature bleed air from either an engine or an auxiliary power unit of the aircraft enters a primary heat exchanger of one of the first and second air conditioning packs 107 and 109 of FIG. 1. The high-pressure high-temperature bleed air is cooled by ram air to produce warm high pressure bleed air. The warm high pressure bleed air then enters a centrifugal compressor of an air cycle machine of one of the first and second air conditioning packs 107 and 109 of FIG. 1. The centrifugal compressor further pressurizes the warm high pressure bleed air and in the process heats it to produce heated pressurized bleed air. The heated pressurized bleed air then enters a secondary heat exchanger of an air cycle machine of one of the first and second air conditioning packs 107 and 109 of FIG. 1 and is cooled by the ram air to approximately ambient temperature, which produces cool high pressure air. This cool high pressure air enters a high pressure water separator of one of the first and second air conditioning packs 107 and 109 of FIG. 1 where it goes through: a reheater, where it is cooled; a condenser, where it is cooled by air from a first turbine of the air cycle machine; a water extractor, where moisture is removed; and the reheater, where it is heated back to nearly a same temperature as when the cool high pressure air entered the high pressure water separator. Upon exiting the high pressure water separator, the bleed air is considered warm high pressure and dry air. The warm high pressure and air enters the first turbine of the air cycle machine, where it is expanded and work is extracted, which produces subsequent bleed air. The subsequent bleed air then enters a cold side of the condenser of the high pressure water separator and is heated to produce heated bleed air. This heated bleed air then enters a second turbine of the air cycle machine and is expanded. Note that the work from the first and second turbines of the air cycle machine drives both the centrifugal compressor and a fan of the air cycle machine that is used to pull a ram air flow through the primary and secondary heat exchangers. After leaving the second turbine, it is mixed with recirculated air and then sent to condition the cabin and flight deck. In the first mode the use of the first and second supplemental packs 111 and 113 can be optional. For instance, in accordance with one or more embodiments, one or more of the first and second supplemental packs 111 and 113 can be turned off or could be used to bring fresh air into the cabin to increase pack outlet flow.

In a high altitude operation (e.g., the second mode), the first and second air conditioning packs 107 and 109 of FIG. 1 can operate in much the same way as in the first mode. In the high altitude operation, the supplemental pack 200 can be utilized to provide cabin inflow (e.g., a fresh air component to the volume 102). The supplemental pack 200 can include two sources of energy: bleed air from the air conditioning pack outlet 233 (e.g., from a primary heat exchanger of one of the first and second air conditioning packs 107 and 109 of FIG. 1) and cabin discharge air from the outside air inlet 241 (e.g., from one or more scooping mechanisms). Further, the compressor 213 can be driven by both the bleed air and cabin discharge air turbines (e.g., the turbines 211 and 215). The compressor 213 receives, compresses, and heats the fresh air. The pressurized outside air is cooled in the heat exchanger 222 and further cooled in the heat exchanger 217 that receives cabin discharge air from the cabin discharge turbine (e.g., the turbine 215). The cooled pressure outside air is then supplied to the cabin (e.g., the volume 102). The bleed air from the air conditioning pack outlet 233 (e.g., from a primary heat exchanger of one of the first and second air conditioning packs 107 and 109 of FIG. 1) is provided to the bleed turbine (e.g., the turbine 211) were it is expanded and energy extracted. The air is cooled in the process of extracting energy and this cooled bleed air is supplied by to the cabin (e.g., the volume 102). In addition, the cabin discharge air passes through the outflow heat exchanger and is heated. The heated cabin discharge air is then expanded in by the cabin discharge turbine and is cooled and is used to further cool the compressed outside air. This cabin discharge air is then dumped overboard or dumped into the ram air inlet. Depending on the altitude, an amount of bleed air required by the first and second air conditioning packs 107 and 109 of FIG. 1 is reduced by 40% to 60%.

Figure 3:
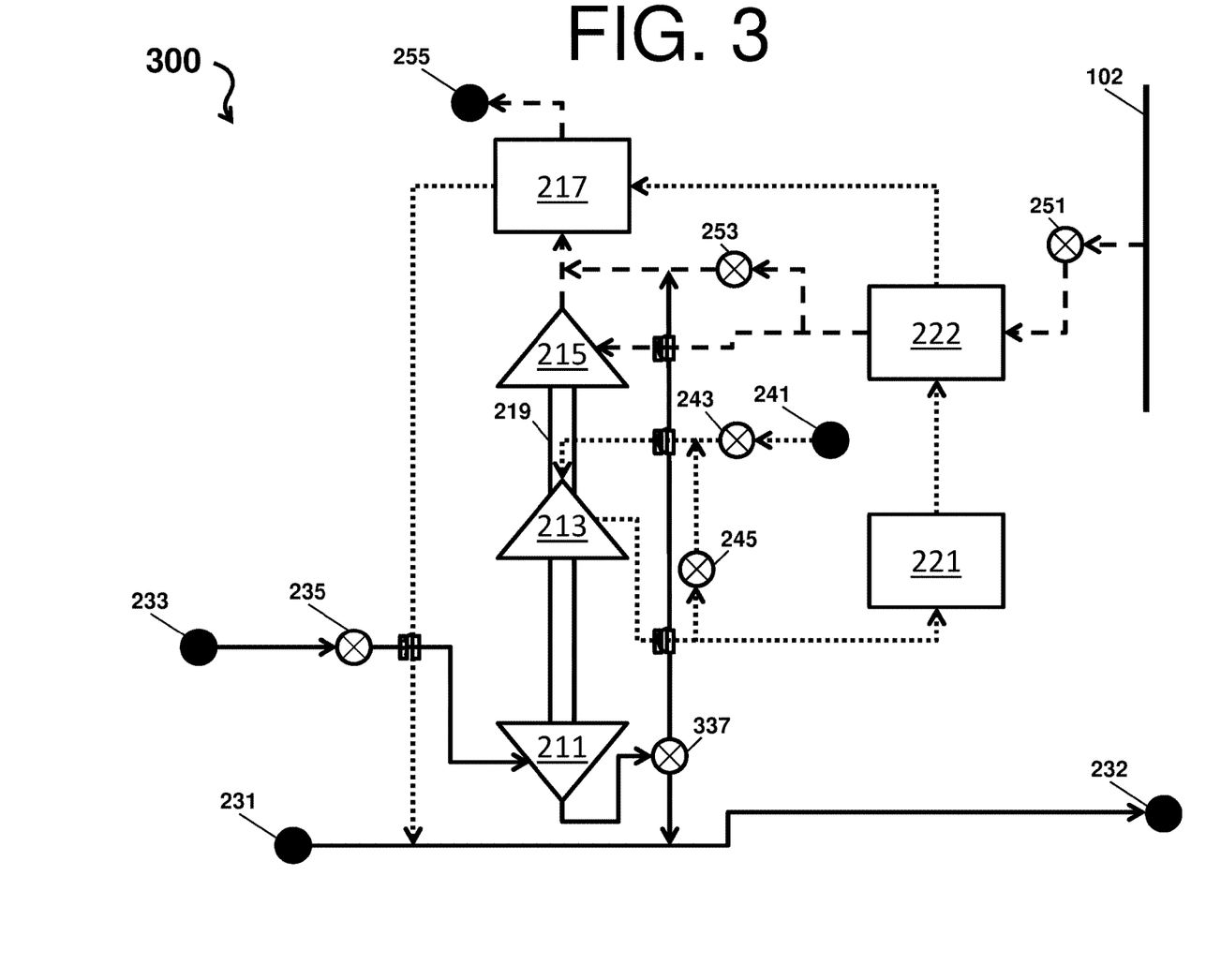
FIG. 3 is a diagram of a schematic of a supplemental pack according to one or more embodiments.

FIG. 3 is a diagram of a schematic of a supplemental pack 300 (e.g., one of the first and second supplemental packs 111 and 113 of FIG. 1) according to one or more embodiments. Components of the pack 300 that are similar to the combined pack architecture 100 of FIG. 1 and/or the supplemental pack 200 of FIG. 2 have been reused for ease of explanation, by using the same identifiers, and are not re-introduced. The supplemental pack 300 comprises a valve 337 on the first medium flow path (e.g., the bleed air flow path). Thus, the supplemental pack 300 comprises both a cabin air discharge turbine (e.g., the turbine 215) and a bleed turbine (e.g., the turbine 211). Further, the supplemental pack 300 can operate in a 100% fresh air mode, when only the cabin air discharge turbine is powering the compressor 213.

In accordance with one or more embodiments, the bleed air of the supplemental pack 300 supplied from the air conditioning pack outlet 233 (e.g., from a primary heat exchanger of one of the first and second air conditioning packs 107 and 109 of FIG. 1) flows through the valve 235 to the turbine 211. The turbine 211 can provides the bleed air to the valve 337. The valve 337 can provide the bleed air to the supplemental pack outlet 232 and/or the cabin discharge air flow path. As shown in FIG. 3, the bleed air can be provided downstream of the turbine 215.

Figure 4:
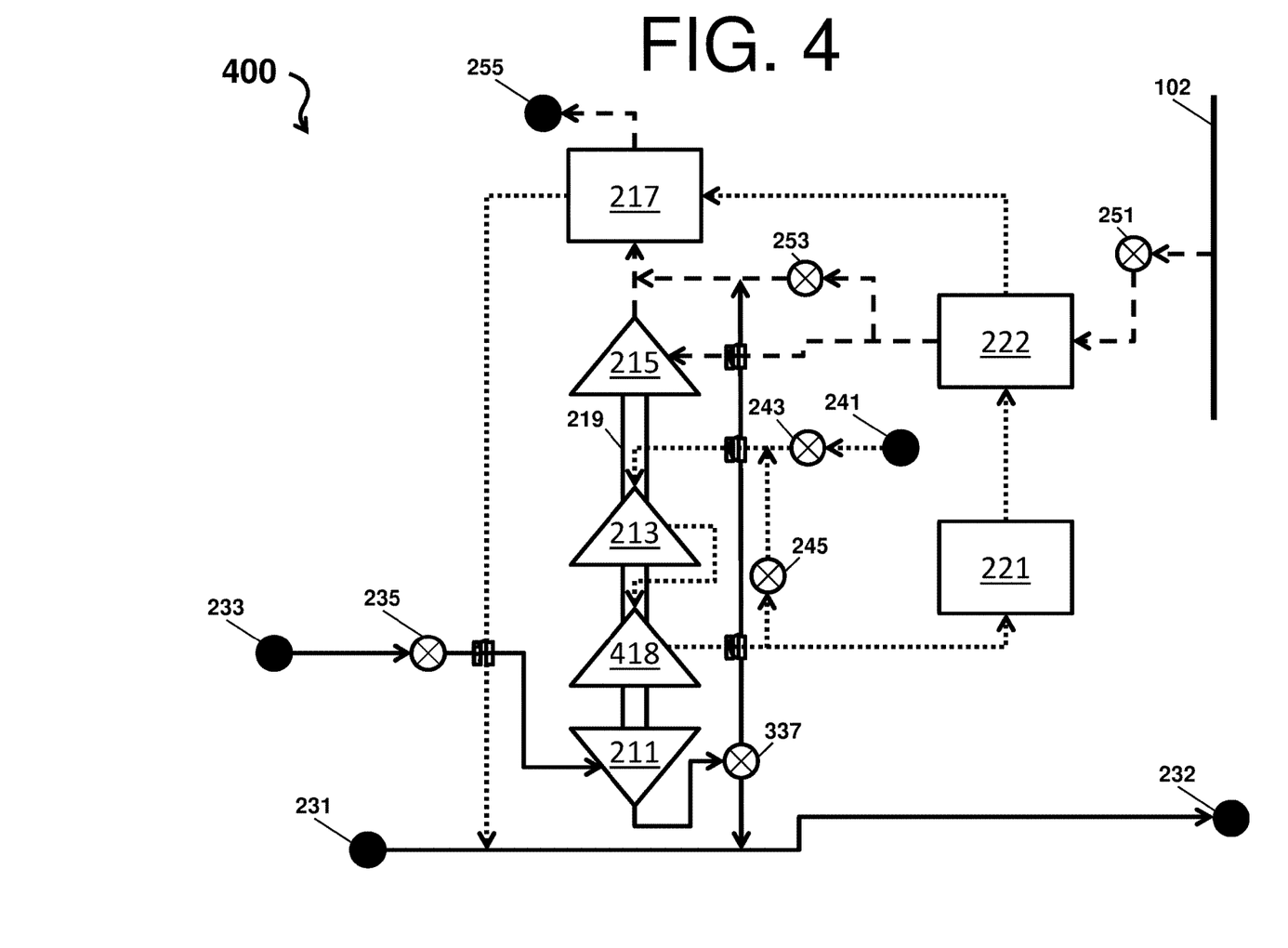
FIG. 4 is a diagram of a schematic of a supplemental pack according to one or more embodiments.

FIG. 4 is a diagram of a schematic of a supplemental pack 400 (e.g., one of the first and second supplemental packs 111 and 113 of FIG. 1) according to one or more embodiments. Components of the pack 400 that are similar to the combined pack architecture 100 of FIG. 1 and/or the supplemental packs 200 and 300 of FIGS. 2 and 3 have been reused for ease of explanation, by using the same identifiers, and are not re-introduced. The supplemental pack 400 comprises a compressor 418 on the shaft 219 that is part of the second medium flow path (e.g., the fresh air flow path). Note that the supplemental pack 400 comprises both a cabin air discharge turbine (e.g., the turbine 215) and a bleed turbine (e.g., the turbine 211); can operate in a 100% fresh air mode; and can provide two stages of compression (e.g., via the compressor 213 and the compressor 418).

In accordance with one or more embodiments, the fresh air of the supplemental pack 400 supplied from the outside air inlet 241 (e.g., from one or more scooping mechanisms) through the valve 243 to the compressor 213. The compressor 213 can provides the fresh air to the compressor 418. The compressor 418 can provide the fresh air through the ozone converter 221 and the heat exchangers 222 and 217 to the supplemental pack outlet 232 (via the bleed air flow path as shown). Also, the fresh air can further flow from the compressor 418 through the valve 245 and back to the compressor 213.

Figure 5:
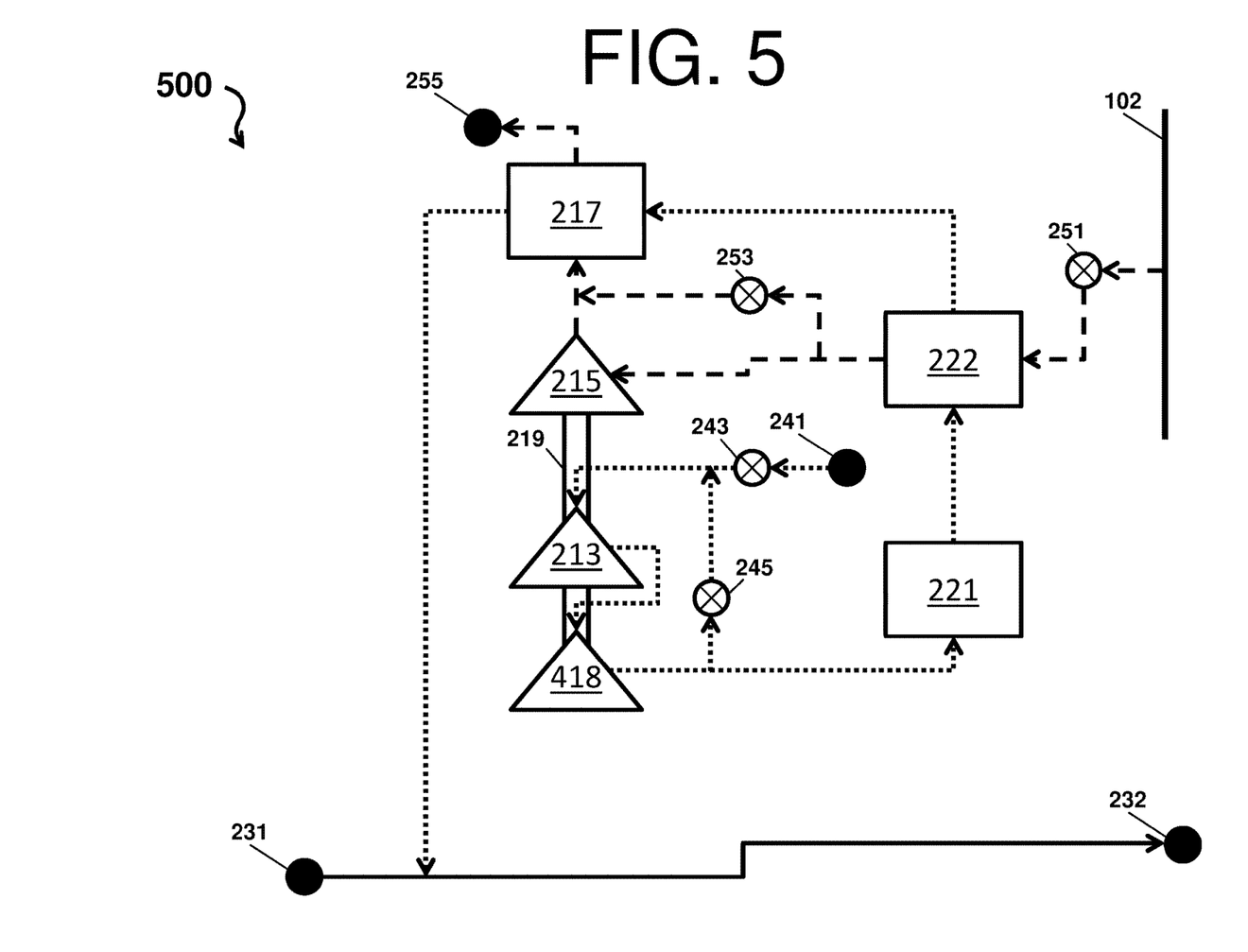
FIG. 5 is a diagram of a schematic of a supplemental pack according to one or more embodiments.

FIG. 5 is a diagram of a schematic of a supplemental pack 500 (e.g., one of the first and second supplemental packs 111 and 113 of FIG. 1) according to one or more embodiments. Components of the pack 500 that are similar to the combined pack architecture 100 of FIG. 1 and/or the supplemental packs 200, 300, and 400 of FIGS. 2, 3, and 4 have been reused for ease of explanation, by using the same identifiers, and are not re-introduced. Note that the supplemental pack 500 does not include a turbine coupled to any air conditioning pack outlet (e.g., from a primary heat exchanger of one of the first and second air conditioning packs 107 and 109 of FIG. 1). Note that the supplemental pack 500 does include the compressor 418 on the shaft 219 that is part of the second medium flow path (e.g., the fresh air flow path). In this regard, the supplemental pack 500 comprises two stages of compression (e.g., via the compressor 213 and the compressor 418).

In accordance with one or more embodiments, a motor can replace any turbines 211 and 215 in any of the supplemental packs 200, 300, 400, and 500 of FIGS. 2, 3, 4, and 5. The motor can be any electro-mechanical device utilized to power compression of the fresh air via the shaft 219.

Aspects of the embodiments are described herein with reference to flowchart illustrations, schematics, and/or block diagrams of methods, apparatus, and/or systems according to embodiments. Further, the descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of embodiments herein. For instance, the steps may be performed in a differing order or steps may be added, deleted or modified. All of these variations are considered a part of the claims.

While the preferred embodiment has been described, it will be understood that those skilled in the art, both now and in the future, may make various improvements and enhancements which fall within the scope of the claims which follow. These claims should be construed to maintain the proper protection.

What is claimed is:

1. A supplemental air conditioning pack, comprising:
 a first compressing device including:
  a shaft;
  a compressor; and
  a turbine coupled to the compressor via the shaft,
 wherein the turbine receives and expands a first medium provided from a first source to provide power to the compressor via the shaft,
 wherein the compressor receives and compresses a second medium provided from a second source in accordance with the power provided by the turbine via the shaft,
 wherein the turbine is fluidly coupled to an outlet of a heat exchanger arranged within a ram air circuit of an air conditioning pack, the air conditioning pack being separate and located upstream from the supplemental pack such that a flow is provided from the air conditioning pack to the supplemental pack in series, the air conditioning pack including a second compressing device, distinct from the first compressing device.

2. The supplemental pack of claim 1, wherein the supplemental pack comprises a second turbine coupled to the compressor via the shaft.

3. The supplemental pack of claim 2, wherein the second turbine receives and expands a third medium to provide power to the compressor via the shaft.

4. The supplemental pack of claim 1, wherein the supplemental pack comprises a second compressor coupled to the shaft.

5. The supplemental pack of claim 4, wherein the second compressor provides a second stage of compression of the second medium.

6. The supplemental pack of claim 1, wherein the first medium comprises bleed air provided from a bleed air source,
 wherein the second medium comprises fresh air provided from a fresh air source.

7. The supplemental pack of claim 1, wherein the supplemental pack is configured to operate in a first or second mode.

8. The supplemental pack of claim 7, wherein the first mode is utilized for low altitude or ground operations.

9. The supplemental pack of claim 7, wherein the second mode is utilized for high altitude operations.

10. A system, comprising:
an air conditioning pack comprising a pack inlet, a pack outlet, and a first compressing device and a first heat exchanger arranged within a ram air circuit along a flow path extending between the pack inlet and the pack outlet; and
a supplemental pack separate from the air conditioning pack, the supplemental pack comprising a second compressing device including a shaft, a compressor, and a turbine coupled to the compressor via the shaft, and at least one second heat exchanger, the supplemental pack being arranged downstream from and in series with the pack outlet of the air conditioning pack relative to a flow of at least one of a plurality of mediums including a first medium provided from first source and a second medium provided from a second source;
wherein an inlet of the turbine is fluidly coupled to an outlet of the first heat exchanger,
wherein the turbine receives and expands the first medium from the first heat exchanger,
wherein the turbine provides power to the compressor via the shaft based on the expansion of the first medium,
wherein the compressor receives and compresses the second medium in accordance with the power provided by the turbine via the shaft.

11. The system of claim 10, wherein the pack comprises a second turbine coupled to the compressor via the shaft,
wherein the second turbine receives and expands a third medium to provide power to the compressor via the shaft.

12. The system of claim 10, wherein the pack comprises a second compressor coupled to the shaft,
wherein the second compressor provides a second stage of compression of the second medium.

13. The system of claim 10, wherein the first medium comprises bleed air provided from a bleed air source,
wherein the second medium comprises fresh air provided from a fresh air source.

14. The system of claim 10, wherein the pack is configured to operate in a first or second mode.

15. The system of claim 14, wherein the first mode is utilized for low altitude or ground operations,
wherein the second mode is utilized for high altitude operations.

* * * * *